US009838433B2

(12) United States Patent
Kakutani

(10) Patent No.: US 9,838,433 B2
(45) Date of Patent: Dec. 5, 2017

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Naoya Kakutani, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/880,611

(22) Filed: Oct. 12, 2015

(65) Prior Publication Data

US 2016/0105461 A1   Apr. 14, 2016

(30) Foreign Application Priority Data

Oct. 14, 2014 (JP) ................................ 2014-209797

(51) Int. Cl.
*G06F 17/00* (2006.01)
*H04L 29/06* (2006.01)
*H04L 29/08* (2006.01)

(52) U.S. Cl.
CPC ............ *H04L 63/20* (2013.01); *H04L 63/083* (2013.01); *H04L 67/306* (2013.01)

(58) Field of Classification Search
CPC ......... H04L 63/20; H04L 63/10; H04L 63/08; H04L 63/1416; H04L 63/1433
USPC ............................................................ 726/1
See application file for complete search history.

(56) References Cited

U.S. PATENT DOCUMENTS

2012/0079266 A1* 3/2012 Ogata ................. H04L 63/0428
                                                             713/150
2014/0068714 A1* 3/2014 Ono ....................... H04L 63/083
                                                                 726/3

FOREIGN PATENT DOCUMENTS

JP         2009-230178 A    10/2009

* cited by examiner

*Primary Examiner* — Kambiz Zand
*Assistant Examiner* — Stephen Sanders
(74) *Attorney, Agent, or Firm* — Canon USA, Inc., IP Division

(57) ABSTRACT

In an information processing apparatus that communicates with a printing control apparatus, whether the printing control apparatus is connected is determined in a case where a security policy is set for the information processing apparatus, and setting of the security policy is activated. The setting of the security policy is deactivated in a case where the printing control apparatus is connected, and the setting of the security policy is applied in a case where the printing control apparatus is not connected.

9 Claims, 11 Drawing Sheets

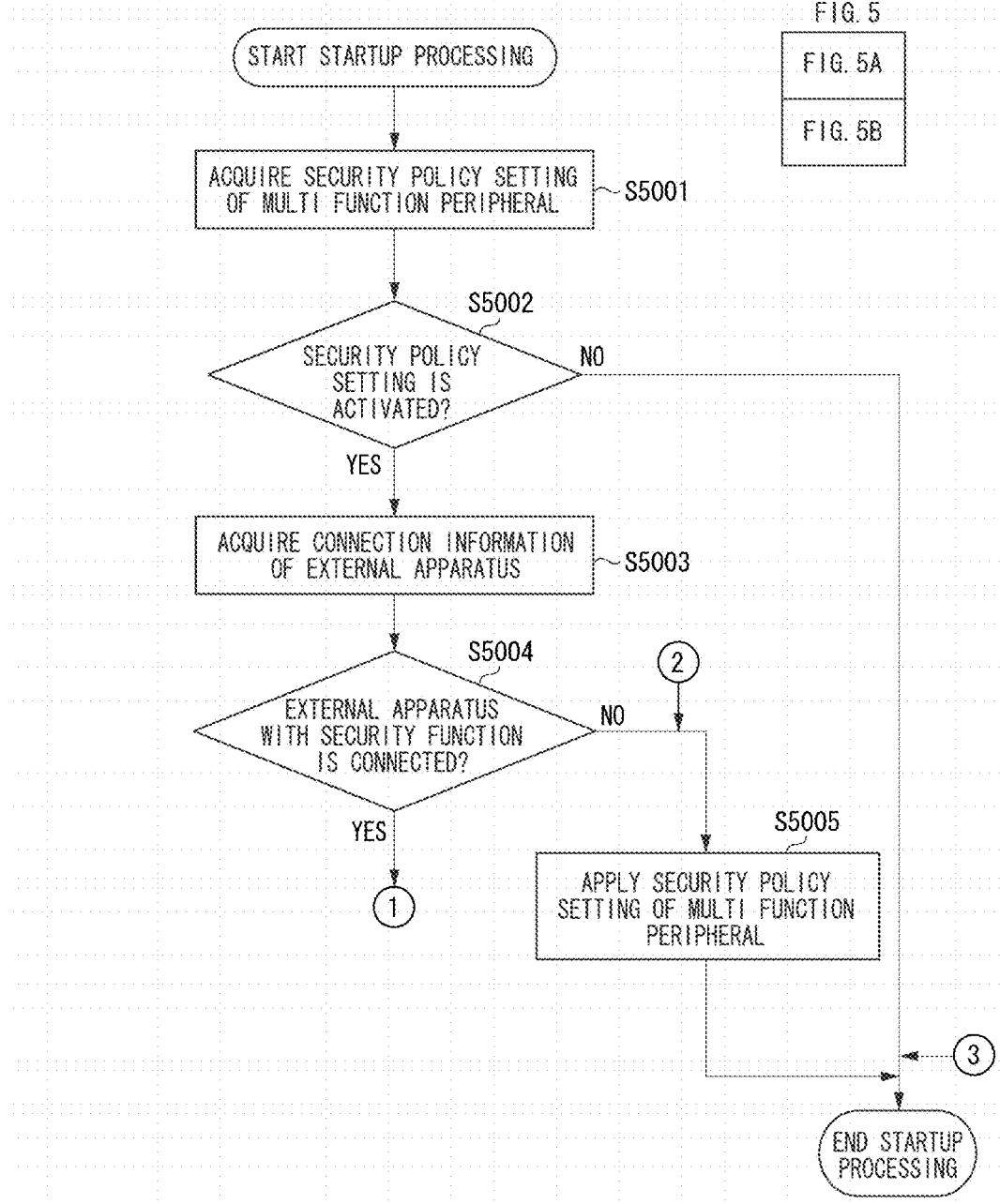

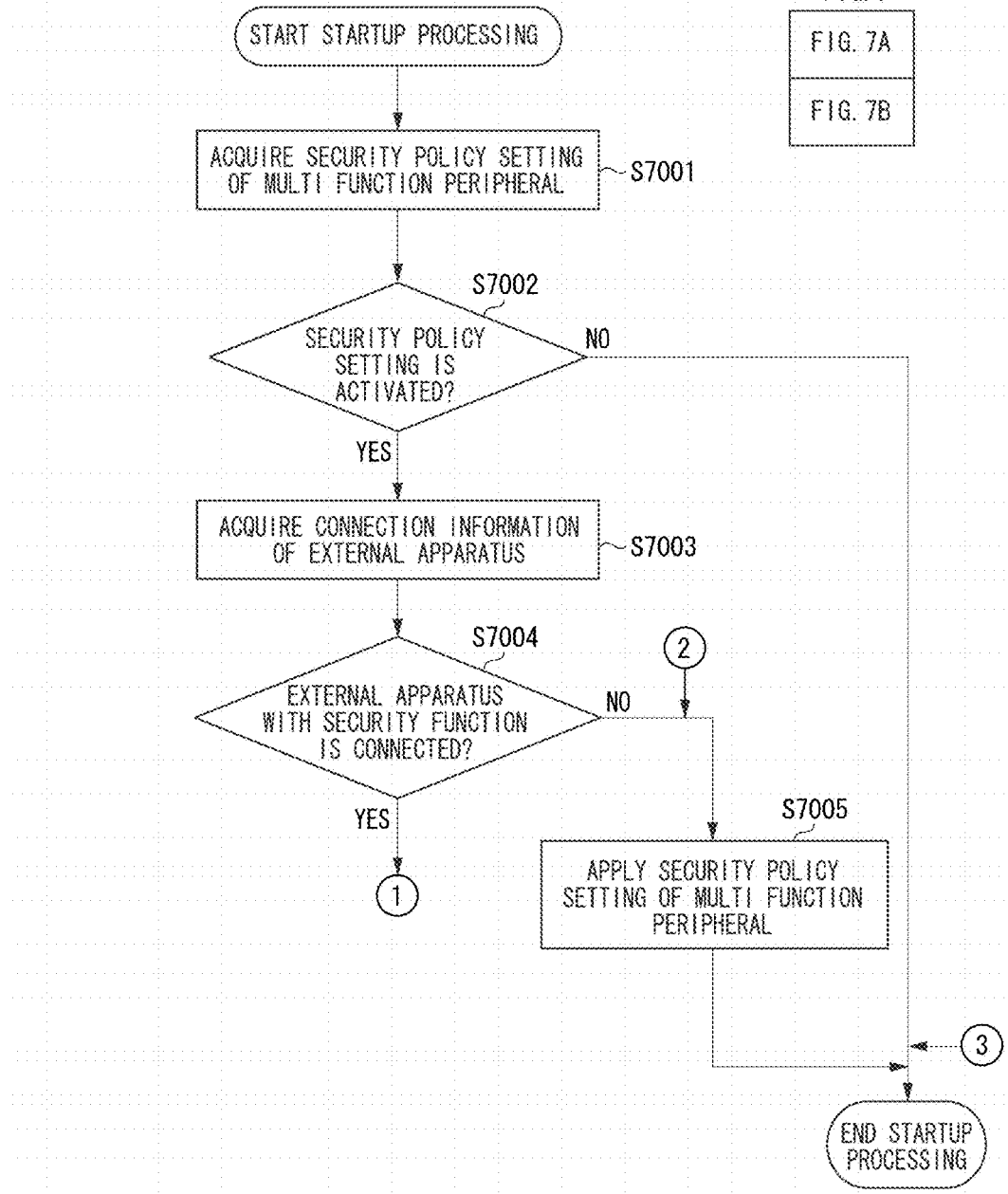

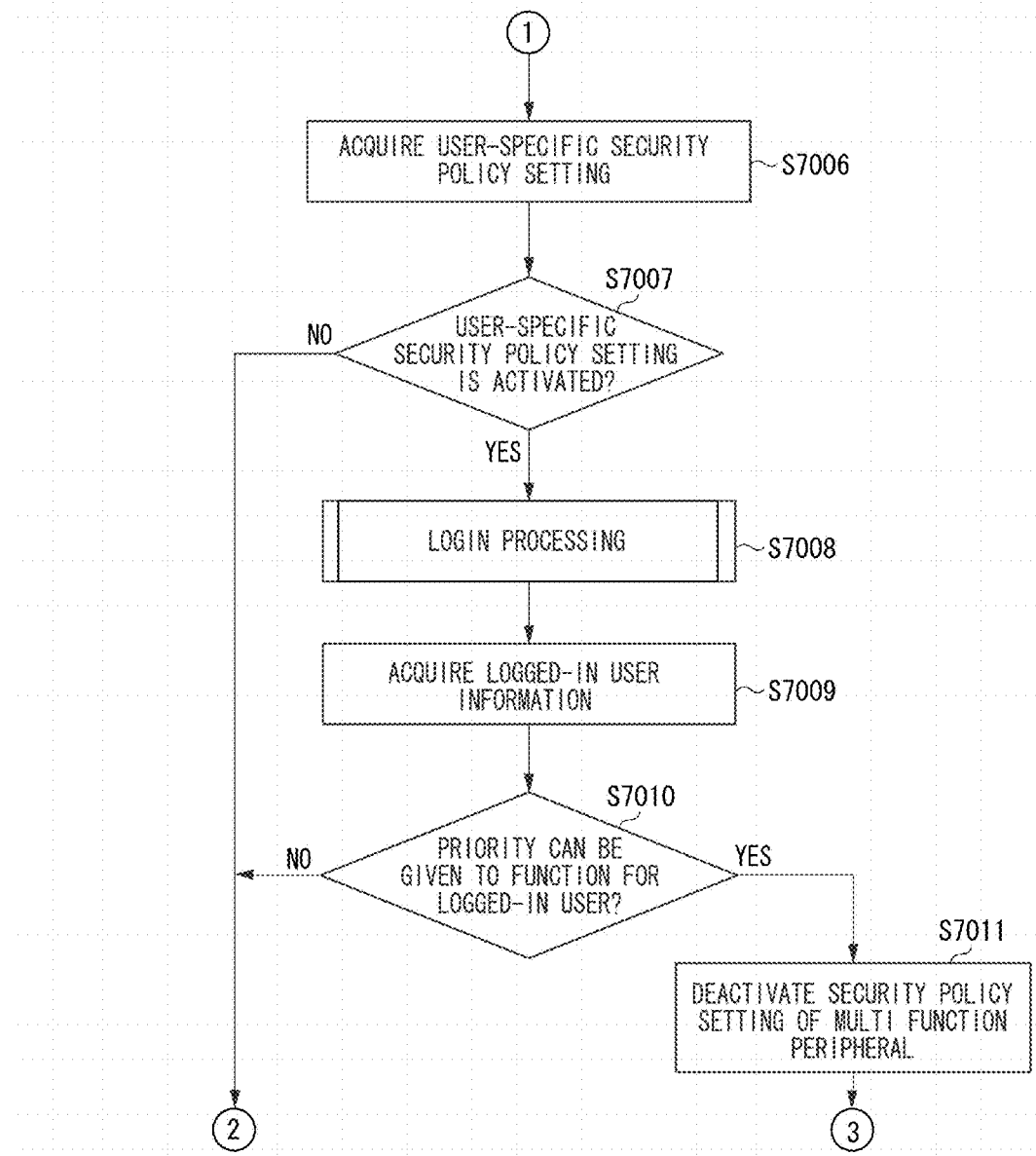

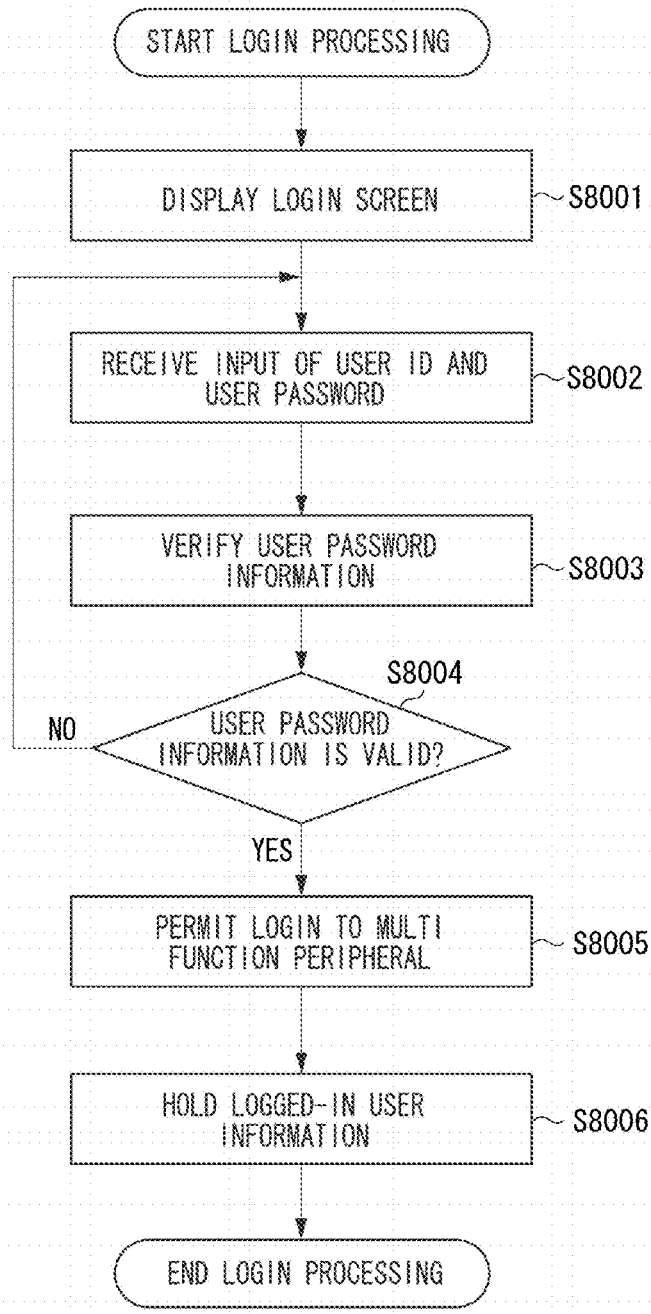

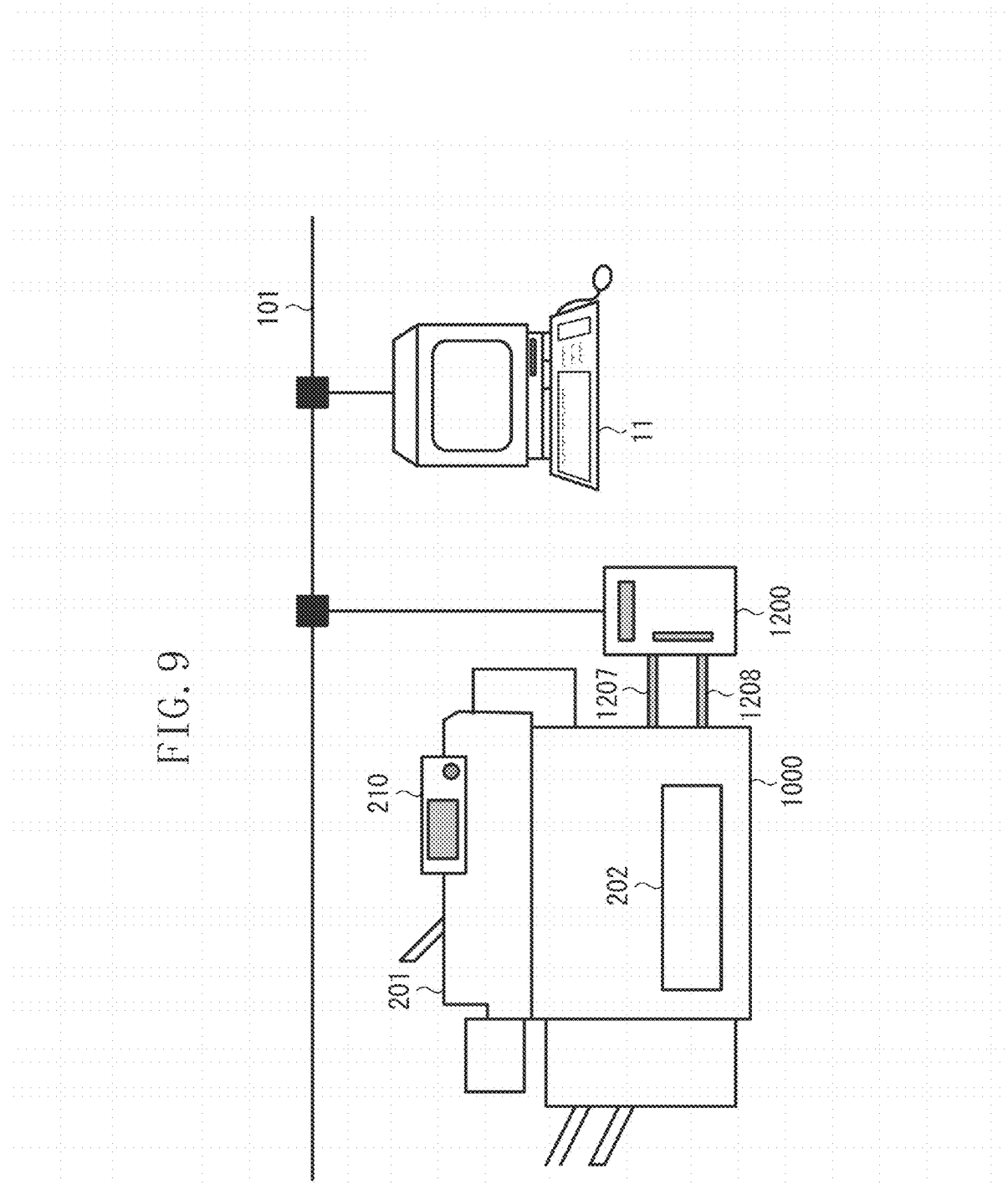

INFORMATION PROCESSING APPARATUS AND CONTROL METHOD FOR INFORMATION PROCESSING APPARATUS

BACKGROUND OF THE INVENTION

Field of the Invention

The present invention relates to an information processing apparatus and a control method for an information processing apparatus.

Description of the Related Art

In a place like an office, apparatuses such as a personal computer (PC) and a server device (such as a file server and an authentication server) are connected to a network. It is desirable to use such apparatuses according to an information security policy determined for each office. The information security policy is a basic policy concerning information security of an entire company. The information security policy is a collection of policies for preventing use of information, an external invasion, and information leakage, and is established by an administrator who handles security.

This security policy covers a wide range of policies including, for example, a policy for requiring apparatuses to perform encryption communication, and a policy for allowing use of only an encryption algorithm with certain intensity or higher. The wide range of policies further include, for example, a policy for restricting use of a specific network port, and a policy for requiring confidential information to be stored in a hardware security chip.

Further, other than the PC and the server device, peripherals such as a multi function peripheral (MFP, or an image forming apparatus) may be provided as the apparatuses connected to the network in the office.

Recent multi function peripherals have been each configured to not only merely print and transmit images, but also store image data and provide a file service function to a PC. In other words, the multi function peripheral acts in a manner similar to other server devices present on a network. In addition, as for the recent multi function peripherals, application development environments have been open to the public, and applications developed by others have been used, as with PCs and the like.

To maintain a secure office environment, the multi function peripherals may be required to comply with the information security policy, as with PCs and server devices. Complying with the information security policy mentioned here refers to imposing restrictions on use in terms of security, to prevent unauthorized use and information leakage of multi function peripherals in an office.

One type of conventional system uses a multi function peripheral to which a security policy is applied, and has a security-policy verification unit for detecting incompliance with the security policy. In this type of system, when a violation of the security policy is detected, a unit for suspending access stops a function of an apparatus. Therefore, it is possible to suppress execution of operations that violate the security policy (e.g., Japanese Patent Application Laid-Open No. 2009-230178).

Meanwhile, some of the multi function peripherals may each be configured to be an apparatus to which an external apparatus having a security-related function is connected. Examples of the external apparatus include an external printing controller and an external hardware security chip. Some of such external apparatuses may each be configured as a fare-paying option of the multi function peripheral, and purchased/used by a user to add/expand a function.

There may be a case where an external apparatus not supporting a security policy is connected to a multi function peripheral in which the security policy is set. In this case, the security policy may be deactivated to give priority to use of a function of the external apparatus, so that convenience can be provided.

In this case, however, in a state of the external apparatus being connected, if the multi function peripheral is used without any restriction, in a specification mode different from a specification intended by an administrator, a problem may arise in terms of security.

SUMMARY OF THE INVENTION

According to an aspect of the present invention, an information processing apparatus communicates with a printing control apparatus, and the information processing apparatus includes a setting unit configured to set a security policy for the information processing apparatus, a determination unit configured to determine whether the printing control apparatus is connected in a case where setting of the security policy is activated, and a control unit configured to deactivate the setting of the security policy in a case where the printing control apparatus is connected, and configured to apply the setting of the security policy of the information processing apparatus in a case where the printing control apparatus is not connected.

Further features of the present invention will become apparent from the following description of exemplary embodiments with reference to the attached drawings.

BRIEF DESCRIPTION OF THE DRAWINGS

FIG. 7, composed of FIG. 7A and FIG. 7B, is a flowchart illustrating a control method for the information processing apparatus.

FIG. 8 is a flowchart illustrating a control method for the information processing apparatus.

FIG. 9 is a diagram illustrating a configuration of a data processing system.

DESCRIPTION OF THE EMBODIMENTS

Exemplary embodiments of the present invention will be described with reference to the drawings.

<Description of System Configuration>

In a first exemplary embodiment, a multi function peripheral (MFP, or a digital MFP) having a security policy function will be taken as an example of an information processing apparatus. However, a scope of applications is not limited to the multi function peripheral, and the information processing apparatus may be of any type having a security-related function and a security policy.

Further, an external apparatus may be connected to the multi function peripheral in the present exemplary embodiment, and an external printing controller having a page description language (PDL) function will be described as an example of the external apparatus. Specifically, an external printing controller 1200 will be described below, as an example. However, the external apparatus is not limited to the external printing controller (a printing control apparatus), and a server, a personal computer (PC), or the like may be employed. In the present exemplary embodiment, the printing control apparatus has a security function, and the multi function peripheral has a function of determining presence/absence of the security function by acquiring relevant information through communication.

Figure 1:
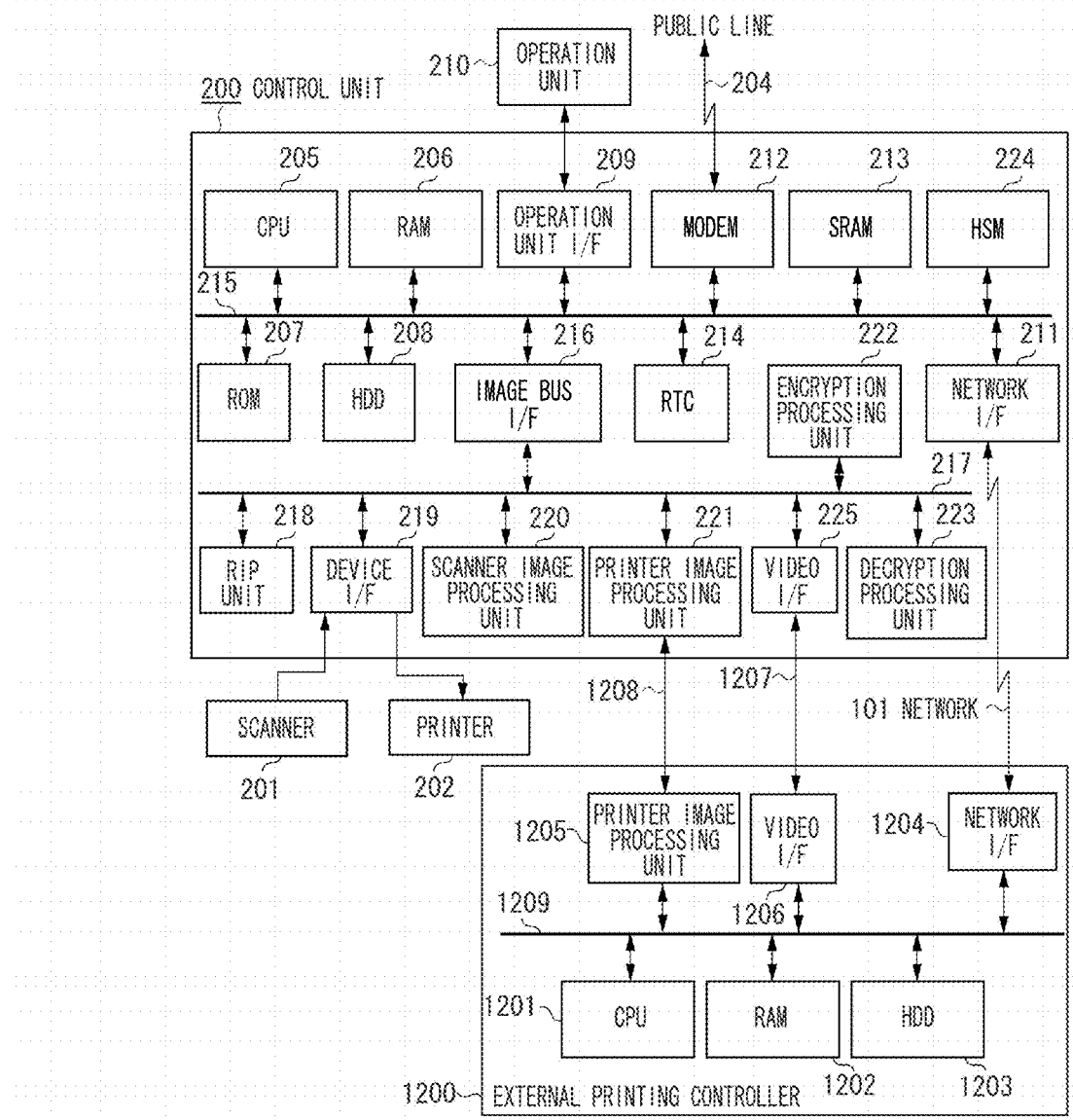
FIG. 1 is a block diagram illustrating an example of an image processing system including an information processing apparatus.

FIG. 1 is a block diagram illustrating an example of an image processing system including the information processing apparatus in the present exemplary embodiment. This example corresponds to a case where an image processing system includes a multi function peripheral 1000 and the external printing controller 1200. A configuration of the multi function peripheral 1000 will be described below. In the present exemplary embodiment, the information processing apparatus is assumed to be a multifunction image forming apparatus, and the multi function peripheral 1000 to be described below is taken as an example thereof.

In FIG. 1, a control unit 200 in the multi function peripheral 1000 is connected to a scanner 201 that is an image input device and a printer 202 that is an image output device, while being connected to a network 101 and a public line 204. The multi function peripheral 1000 thereby performs input and output of image information and device information.

A central processing unit (CPU) 205 is a processor that controls the entire multi function peripheral 1000. A random access memory (RAM) 206 is a system work memory for allowing the CPU 205 to operate, and also serves as a memory for temporarily storing image data, user information, a password, and the like. A read only memory (ROM) 207 is a boot ROM, and stores a boot program of the system. A hard disk drive (HDD) 208 is a storage that stores system software, applications, and image data. The HDD 208 also stores a program for executing a flowchart to be described below in the exemplary embodiment. The CPU 205 performs control to be described below, by executing the program stored in the HDD 208. Further, a processor other than the CPU 205 may execute processing to be executed, or the CPU 205 and other processor may execute this processing by working together.

An operation unit interface (I/F) 209 is an interface section to an operation unit 210 having a touch panel, and outputs to the operation unit 210 image data to be displayed on the operation unit 210. Further, the operation unit I/F 209 serves to convey information, which is input via the operation unit 210 by a user using this system, to the CPU 205. A network I/F 211 performs input/output of information by connecting to the network 101. A modulator-demodulator (MODEM) 212 performs input/output of information by connecting to the public line 204. A static random access memory (SRAM) 213 is a nonvolatile recording medium operable at high speed. A real time clock (RTC) 214 is a clock that performs processing to keep counting the current time, even in a state where the multi function peripheral 1000 is powered off. The above-described devices are arranged on a system bus 215.

An image bus I/F 216 is a bus bridge for converting a data structure by connecting the system bus 215 to an image bus 217 that transfers image data at high speed. The image bus 217 is configured of a Peripheral Component Interconnect (PCI) bus or configured based on the Institute of Electrical and Electronics Engineers (IEEE) 1394. The following devices are arranged on the image bus 217. A raster image processor (RIP) unit 218 is a raster image processor that develops a PDL code into a bitmap image. A device I/F 219 performs synchronous/asynchronous conversion of image data, by connecting the control unit 200 to the scanner 201 serving as an image input device or the printer 202 serving as an image output device. A scanner image processing unit 220 performs correction, modification, editing for input image data. A printer image processing unit 221 performs correction, resolution conversion, and the like of the printer, for print output image data.

Further, the printer image processing unit 221 controls PDL print processing for printing by a printer engine, and performs transmission/reception of control commands to/from a printer image processing unit 1205. An encryption processing unit 222 performs encryption processing for input data including image data. A decryption processing unit 223 performs decryption processing for encrypted data. A hardware security module (HSM) 224 provides storage and use of an encryption key to be used in the multi function peripheral 1000.

The CPU 205 in the multi function peripheral 1000 controls the processing of the multi function peripheral 1000 in the present specification. In the present specification, a control unit of the multi function peripheral 1000 includes the CPU 205, the RAM 206, the ROM 207, the HDD 208, the SRAM 213, and the like. A procedure represented by the flowchart to be described below is stored in a storage unit that is any of the RAM 206, the ROM 207, the HDD 208, and the SRAM 213 included in the control unit. The CPU 205 executes such procedure.

A configuration of the external printing controller 1200 illustrated in FIG. 1 will be described.

In the external printing controller 1200, a CPU 1201 performs control, computing, and execution of a program stored in a storage device, for each part in the external printing controller 1200, via a system bus 1209. A RAM 1202 is used as a temporary storage area in image development of PDL data to be printed, and as a work memory. An HDD 1203 is a large-capacity storage device, and stores various control programs to be executed by the CPU 1201. Further, the HDD 1203 is used as a temporary storage area for data to be processed, and as a storage area for a print job. A network I/F 1204 performs communication with another apparatus such as a client computer, via the network 101. The printer image processing unit 1205 serves as a network interface as well, and performs control of PDL print processing as well as transmission/reception of control commands to/from the multi function peripheral 1000. A video I/F 1206 is an interface connected to a video I/F 225 of the multi function peripheral 1000, by an image transfer video cable 1207.

FIG. 9 is a diagram illustrating a configuration of a data processing system to which the image processing system illustrated in FIG. 1 is applied.

In FIG. 9, the network 101 is an Ethernet® cable connected to a local area network (LAN). Further, a client computer 11 is provided. The user operates an application on the client computer 11, so that printing is performed by a printer driver. In FIG. 9, the client computer 11 and the multi function peripheral 1000 are each connected as one apparatus, but one or more of each of these apparatuses may be connected.

The multi function peripheral 1000 is connected to the external printing controller 1200 via the image transfer video cable 1207 and an Ethernet cable 1208.

Setting of a security policy of the multi function peripheral 1000 will be described using FIG. 2.

Figure 2:
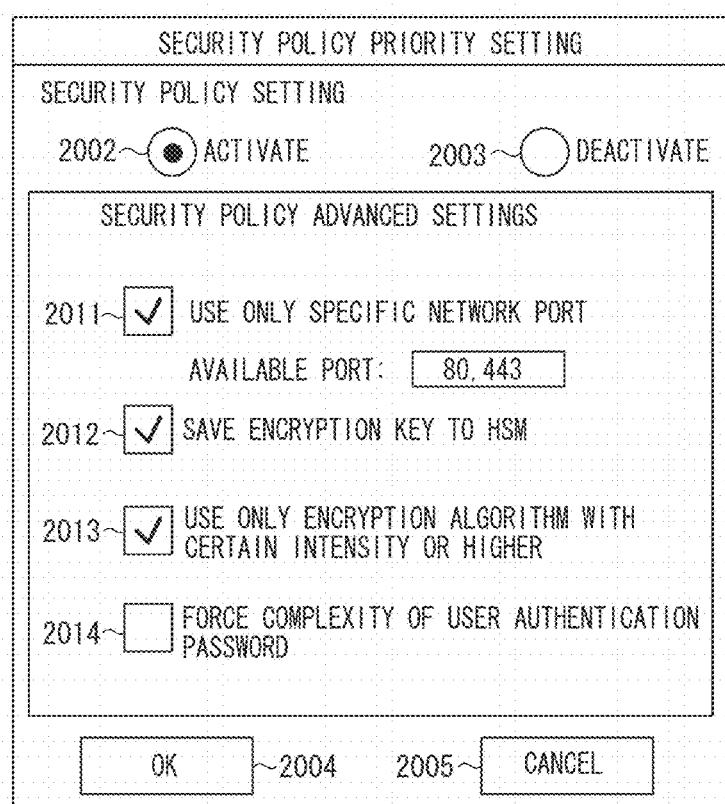
FIG. 2 is a diagram illustrating an example of a user interface (UI) screen displayed on an operation unit.

FIG. 2 is a diagram illustrating an example of a user interface (UI) screen displayed on the operation unit 210 illustrated in FIG. 1. A security policy priority setting screen 2001 for setting a security policy function is illustrated as this example. Further, in the present exemplary embodiment, the security policy is configured to allow designation of an available port, designation of a storage destination of an encryption key, designation of intensity of encryption processing, and designation of complexity of authentication information.

The user selects either an activation button 2002 for activating security policy setting, or a security policy setting deactivation button 2003, thereby setting the security policy function. The activation button 2002 is displayed within the security policy priority setting screen 2001 via the operation unit 210.

In the security policy priority setting screen 2001, security policy advanced settings can be selected by selecting the activation button 2002. In the present exemplary embodiment, four security policies can be set here, for the multi function peripheral 1000.

In the security policy advanced settings of the present exemplary embodiment, a specific network port use policy setting 2011 and an HSM use policy setting 2012 are assumed to be settable. Similarly, in the security policy advanced settings, an encryption algorithm use policy setting 2013 and a password policy setting 2014 are assumed to be settable. These are each set by marking a check box via the operation unit 210.

When the specific network port use policy setting 2011 is activated, only a specific network port is open, and other network ports of the multi function peripheral 1000 are unavailable. In the present exemplary embodiment, only ports numbered 80 and 443 are available as illustrated in FIG. 2.

When the HSM use policy setting 2012 is activated, an encryption key, which is to be used to encrypt a file or a password, of the multi function peripheral 1000 is forcefully held in a hardware security chip such as a Trusted Platform Module (TPM).

When the encryption algorithm use policy setting 2013 is activated, a hash algorithm with certain intensity or higher, e.g., a key length of 2048 bits or more, and Secure Hash Algorithm (SHA)-256 or more, is forcefully used. When the password policy setting 2014 is activated, a condition for setting a password to be used in user authentication is forcefully adopted. In the present exemplary embodiment, mixing uppercase and lowercase alphanumeric characters in a password is forced, and using eight or more characters to form the password is forced.

Security setting of a security-related function such as a network, encryption, and user authentication is forced by thus setting the security policy in the multi function peripheral 1000. Therefore, use at a high security level can be achieved.

In the present exemplary embodiment, such setting by the activation button 2002 or the security policy setting deactivation button 2003 is referred to as "security policy setting". Further, setting of the security polices of the security policy advanced settings 2011 to 2014 is referred to as "security policy advanced settings". The security policy setting after changed is stored into the SRAM 213 of the control unit, by selecting a security policy setting completion (OK) button 2004.

In the present exemplary embodiment, the security policy setting can be displayed and operated on the operation unit 210 of the multi function peripheral 1000. However, there is no limitation in particular in this respect. For example, the multi function peripheral 1000 may provide a remote UI to the external apparatus via a network, thereby allowing display and setting.

There will be described processing to be performed when the multi function peripheral 1000, in which the security policy setting is activated, determines whether the external printing controller 1200 not supporting the security policy is connected. Specifically, processing of deactivating the security policy set in the UI screen illustrated in FIG. 2 will be described using FIGS. 1 to 3.

Figure 3:
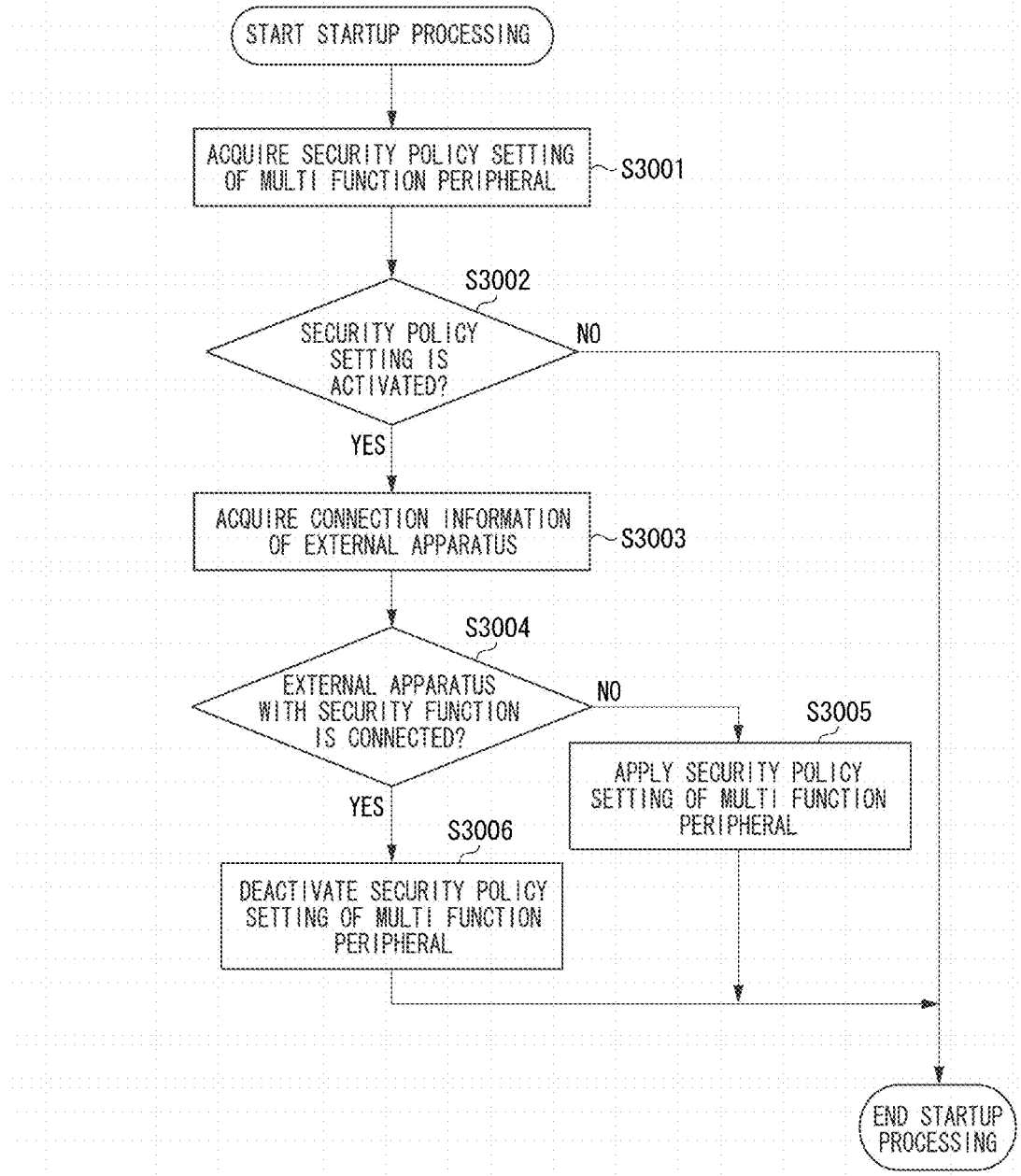
FIG. 3 is a flowchart illustrating a control method for the information processing apparatus.

FIG. 3 is a flowchart illustrating a control method for the information processing apparatus. This is a processing example in which the security policy setting is acquired and controlled upon startup of firmware of the multi function peripheral 1000 illustrated in FIG. 1. The CPU 205 executes the stored control program, thereby implementing each step.

In step S3001, the CPU 205 acquires the security policy setting of the multi function peripheral 1000 held in the SRAM 213. Next, in step S3002, the CPU 205 determines whether the security policy setting is activated.

When the CPU 205 determines that the security policy setting is not activated (NO in step S3002), in other words, the security policy setting deactivation button 2003 is set in the UI screen illustrated in FIG. 2, the startup processing ends.

On the other hand, when the CPU 205 determines that the security policy setting is activated (YES in step S3002), the processing proceeds to step S3003. In step S3003, the CPU 205 acquires information of the external printing controller 1200 connected to the multi function peripheral 1000 as the external apparatus, and then the processing proceeds to step S3004.

In step S3004, the CPU 205 determines whether an external printing controller having a security-related function but not supporting the security policy is connected to the multi function peripheral 1000. Here, as an example of such an external printing controller, the external printing controller 1200 connected via the network 101 is employed. How to identify the external printing controller 1200 is not limited in particular. In the present exemplary embodiment, the CPU 205 is assumed to transmit a predetermined communication command to the external printing controller 1200, thereby identifying the external printing controller 1200 based on a response to this communication command.

In step S3004, the CPU 205 determines whether the external printing controller 1200 not supporting the security policy is connected. Here, when determining that the external printing controller 1200 not supporting the security policy is not connected (NO in step S3004), the CPU 205 acquires the security policy advanced settings from the SRAM 213 of the control unit. Then, in step S3005, the CPU 205 applies the security policy to each function, which is set in the UI screen illustrated in FIG. 2, of the multi function peripheral 1000. This ends the startup processing.

In the application/activation of the security policy setting in the present exemplary embodiment, the setting values of the multi function peripheral 1000 that are associated with the respective security policy advanced settings 2011 to 2014 are forcibly activated. In this state, the user using the multi function peripheral 1000 is not allowed to change the setting values.

On the other hand, when the CPU 205 determines that the external printing controller 1200 not supporting the security policy is connected (YES in step S3004), the processing proceeds to step S3006. In step S3006, the CPU 205 deactivates the security policy setting for each function of the multi function peripheral 1000. This ends the startup processing.

In the deactivation of the security policy setting in the present exemplary embodiment, the setting is changed from the activation button 2002 to the security policy setting deactivation button 2003, and the selections of the security policy advanced settings 2011 to 2014 are all canceled. This cancels the forced activation state, which is associated with this security policy setting, of the multi function peripheral 1000.

By the above-described processing, the security policy is deactivated for the multi function peripheral 1000 in which the security policy is set, in a case where the external printing controller 1200 not supporting the security policy is connected to the multi function peripheral 1000. As a result, the function of the external printing controller 1200 can be used.

Therefore, when the external printing controller 1200 is used with the multi function peripheral 1000, the function of the external printing controller 1200 can be used without restrictions due to the security policy. Accordingly, it is possible to provide flexible use for a buyer/administrator of the multi function peripheral 1000.

In the above-described first exemplary embodiment, the external printing controller 1200 connected to the multi function peripheral 1000 does not have security policy setting, and the information of the external printing controller 1200 to be connected is predetermined.

However, when the external printing controller 1200 holds own security policy setting, this security policy setting may conflict with the security policy setting of the multi function peripheral 1000. In this case, the multi function peripheral 1000 may acquire information about the setting of the security policy from the external printing controller 1200, and then switch between the respective security policies depending on which one takes priority over the other. Therefore, the apparatus can be used more flexibly.

In a second exemplary embodiment having such a modified configuration, the multi function peripheral 1000, to which the security policy is applied, acquires the security policy setting from the external printing controller 1200, and performs processing to be described below. In a processing example to be described below, there will be performed such control that the multi function peripheral 1000 acquires the security policy setting from the external printing controller 1200 connected to itself, thereby determining which one of the security policies takes priority over the other. Such security-policy switching control to be executed by the multi function peripheral 1000 in the present exemplary embodiment will be described below in detail, with reference to FIGS. 1, 4, and 5. The present exemplary embodiment is similar to the first exemplary embodiment in terms of configuration of the multi function peripheral 1000 and security policy setting processing.

Figure 5B:
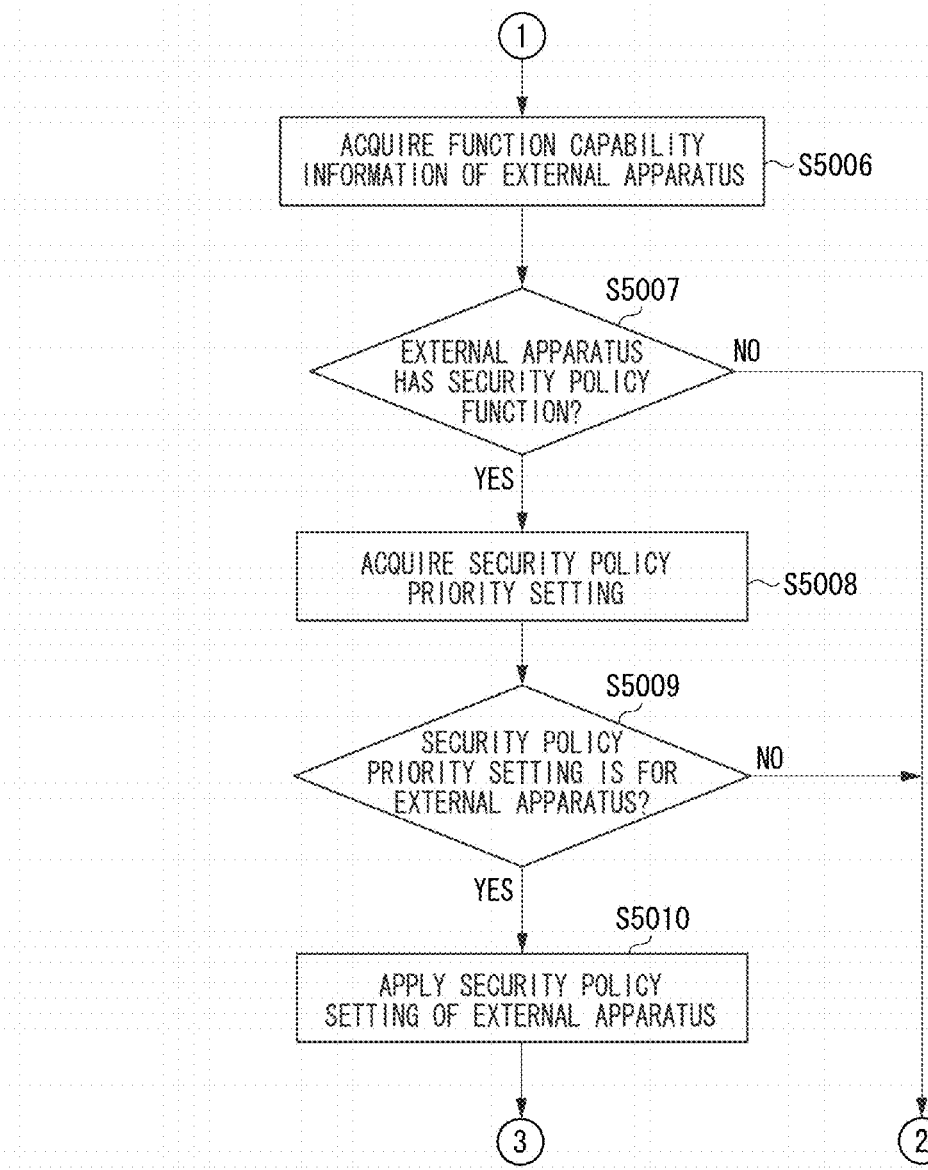
FIG. 5, composed of FIG. 5A and FIG. 5B, is a flowchart illustrating a control method for the information processing apparatus.

FIG. 5, composed of FIGS. 5A and 5B, is a flowchart illustrating a control method for the information processing apparatus in the present exemplary embodiment. In FIG. 5B in the present exemplary embodiment, processing of step S5006 to step S5010 is added to the processing of FIG. 3 in the first exemplary embodiment. Such added processing is related to the control in which the multi function peripheral 1000 acquires the security policy setting from the external printing controller 1200 connected to itself, thereby determining which one of the security policies takes priority over the other. Details of the processing will be described below.

Processing of step S5001 to step S5005 illustrated in FIG. 5A is similar to the processing of step S3001 to step S3005 described in the flowchart of FIG. 3 corresponding to the first exemplary embodiment.

Figure 4:
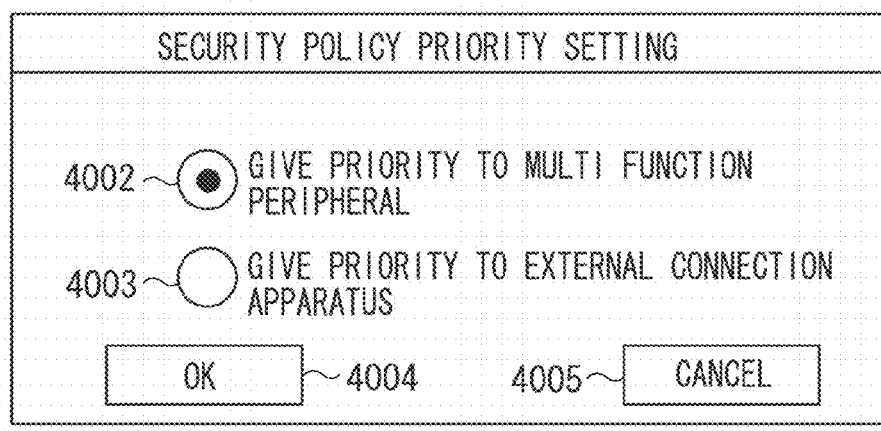
FIG. 4 is a diagram illustrating an example of a UI screen displayed on the operation unit.

The multi function peripheral 1000 in the present exemplary embodiment has a security policy priority setting screen 4001 illustrated in FIG. 4. The CPU 205 of the control unit causes the operation unit 210 to display this screen.

The security policy priority setting screen 4001 has a key 4002 for setting priority to the security policy of the multi function peripheral 1000, and a key 4003 for setting priority to the security policy of the external printing controller 1200. In the present exemplary embodiment, these settings will be referred to as "security policy priority setting".

This security policy priority setting is enabled, only when the activation button 2002 of FIG. 2 is activated. When a button 4004 for completing the security policy priority setting is selected, the CPU 205 stores the changed security policy priority setting into the SRAM 213. This security policy priority setting is assumed to be allowed by the administrator of the multi function peripheral 1000. This security policy priority setting in the present exemplary embodiment can be displayed and operated on the operation unit 210 of the multi function peripheral 1000, as with the above-described security policy setting. However, display and setting may be allowed via a remote UI.

When the multi function peripheral 1000 and the external printing controller 1200 connected thereto each have the security policy, the security policy to be applied to both of these apparatuses can be switched to the other according to this security policy priority setting. This processing will be described below in detail, with reference to step S5009 to step S5010.

Of the processing in FIG. 5, a part changed from the first exemplary embodiment will be described.

In step S5004, the CPU 205 determines whether the external printing controller 1200 having the security-related function is connected to the multi function peripheral 1000. Here, when the CPU 205 determines that the external printing controller 1200 having the security-related function is not connected to the multi function peripheral 1000 (NO in step S5004), the processing proceeds to step S5005. In step S5005, the security policy setting of the multi function peripheral 1000 is applied to each security-related function. This ends the startup processing.

If the CPU 205 determines that the external printing controller 1200 having the security-related function is connected to the multi function peripheral 1000 (YES in step S5004), then in step S5006, the CPU 205 acquires function capability information of the connected external printing controller 1200. Here, in step S5006, when the external printing controller 1200 has the security policy function, the CPU 205 acquires the security policy function as the function capability information.

In step S5007, the CPU 205 determines whether the external printing controller 1200 connected to the multi function peripheral 1000 has the security policy function.

When the CPU 205 determines that the external printing controller 1200 connected to the multi function peripheral 1000 does not have the security policy function (NO in step S5007), the processing proceeds to step S5005. In step S5005, the security policy setting of the multi function peripheral 1000 is applied to each security-related function. This ends the startup processing.

On the other hand, when the CPU 205 determines that the external printing controller 1200 connected to the multi function peripheral 1000 has the security policy function (YES in step S5007), the processing proceeds to step S5008. In step S5008, the CPU 205 acquires the security policy priority setting from the SRAM 213, and then the processing proceeds to step S5009.

In step S5009, the CPU 205 determines whether the acquired security policy priority setting is setting that gives priority to an external connection apparatus.

Specifically, the CPU 205 determines whether the acquired security policy priority setting gives priority to the security policy of the multi function peripheral 1000 or to the security policy of the external printing controller 1200.

When the CPU 205 determines that the acquired security policy priority setting gives priority to the security policy of the multi function peripheral 1000 (NO in step S5009), the processing proceeds to step S5005. In step S5005, the security policy setting of the multi function peripheral 1000 is applied to each security-related function. This ends the startup processing.

On the other hand, when the CPU 205 determines that the acquired security policy priority setting gives priority to the security policy of the external printing controller 1200 (YES in step S5009), the processing proceeds to step S5010. In step S5010, the security policy setting of the external printing controller 1200 is applied to each security-related function. This ends the startup processing.

In the above-described processing, when the security policy of the multi function peripheral 1000 is being activated, the multi function peripheral 1000 acquires the security policy setting from the external printing controller 1200 connected to itself, thereby determining which one of the security policies takes priority over the other. Such control allows switching between the security policies to set whichever takes priority, so that use in a more flexible manner for the administrator of the apparatus can be achieved.

In the first exemplary embodiment and the second exemplary embodiment described above, the security policy of the apparatus is uniformly determined according to the setting of the multi function peripheral 1000. However, one or more users may use the multi function peripheral 1000, and the users may have the respective authorities for the apparatus.

In this case, it is possible to use the apparatus more flexibly by switching between application and non-application of the security policy depending on user information such as a user ID and user authority.

In the third exemplary embodiment, there will be described such control that the multi function peripheral 1000 determines, according to user information, whether to give priority to the security policy in the multi function peripheral 1000 to which the security policy is applied.

In the following, security-policy switching control to be executed by the multi function peripheral 1000 in the present exemplary embodiment will be described in detail, with reference to FIGS. 1, 6, 7A and 7B, and 8. The present exemplary embodiment is similar to the first and second exemplary embodiments in terms of configuration of the multi function peripheral 1000 and security policy setting processing.

In processing of FIG. 7 in the present exemplary embodiment, processing of step S7006 to step S7010 is added to the processing of FIG. 3 in the first exemplary embodiment. This added processing relates to such control that the multi function peripheral 1000 switches between giving priority to the function and giving priority to the security policy, for a user, based on logged-in user information and user-specific security policy setting. Details of this processing will be described below.

FIG. 7 is a flowchart illustrating a control method for the information processing apparatus in the present exemplary embodiment. Processing from step S7001 to step S7005 of the flowchart illustrated in FIG. 7 in the present exemplary embodiment is similar to processing of step S3001 to step S3005 described in the flowchart of FIG. 3 of the first exemplary embodiment.

Figure 6:
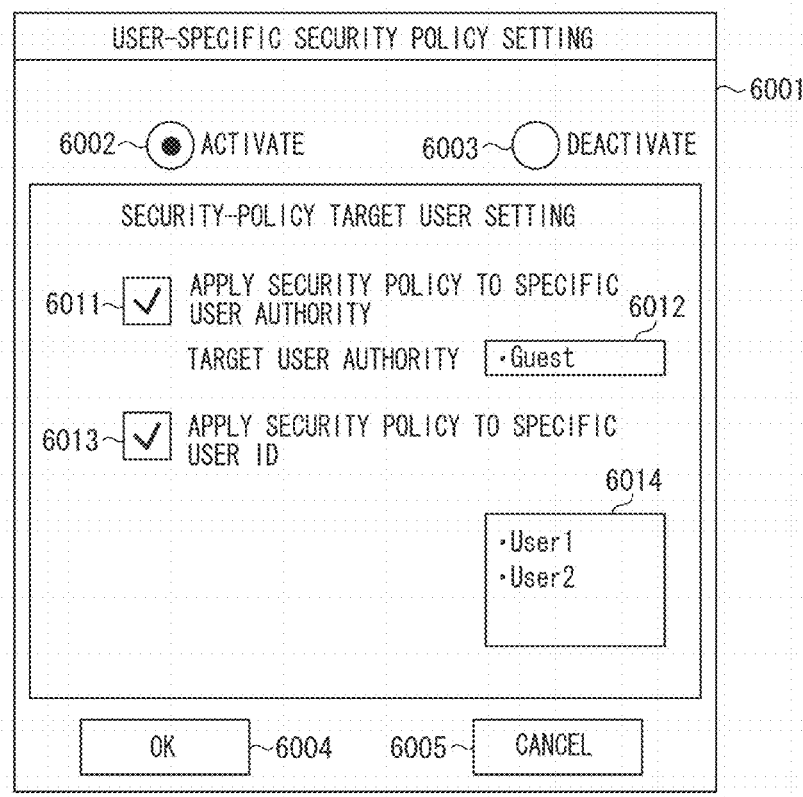
FIG. 6 is a diagram illustrating an example of a UI screen displayed on the operation unit.

The multi function peripheral 1000 in the present exemplary embodiment has a user-specific security policy setting screen 6001 illustrated in FIG. 6. The CPU 205 causes the operation unit 210 to display this screen.

FIG. 6 is a diagram illustrating an example of a UI screen displayed on the operation unit 210 illustrated in FIG. 1.

The user-specific security policy setting screen 6001 has an activation button 6002 for activating the user-specific security policy setting, and a deactivation button 6003 for deactivating the user-specific security policy setting. In the present exemplary embodiment, these settings will be referred to as "user-specific security policy setting". This user-specific security policy setting can be set, only when the activation button 2002 of FIG. 2 is activated.

User settings 6011 to 6014 for setting a security policy target become selectable, by selecting the activation button 6002. In the present exemplary embodiment, whether to apply the security policy to specific user authority and a specific user ID can be set for the multi function peripheral 1000. For example, in FIG. 6 in the present exemplary embodiment, a user having "Guest" as user authority is set by the user settings 6011 and 6012. Further, users having "User1" and "User2" as the respective user IDs are set by the user settings 6013 and 6014.

When a setting determination button 6004 is selected, the CPU 205 stores these settings into the SRAM 213. In the present exemplary embodiment, the administrator of the multi function peripheral 1000 is assumed to perform this user-specific security policy setting. In the present exemplary embodiment, as with the above-described security policy setting, this user-specific security policy setting can be displayed and operated on the operation unit 210 of the multi function peripheral 1000. However, display and setting may be allowed via a remote UI.

Of the processing in FIG. 7, a part changed from the first exemplary embodiment will be described.

In step S7004, the CPU 205 determines whether the external printing controller 1200 having the security-related function is connected to the multi function peripheral 1000. When the CPU 205 determines that the external printing controller 1200 having the security-related function is not connected to the multi function peripheral 1000 (NO in step S7004), the processing proceeds to step S7005. In step S7005, the security policy setting of the multi function peripheral 1000 is applied to each security-related function. This ends the startup processing.

If the CPU 205 determines that the external printing controller 1200 having the security-related function is connected to the multi function peripheral 1000 (YES in step S7004), then in step S7006, the CPU 205 acquires the user-specific security policy setting from the SRAM 213. The processing then proceeds to step S7007.

In step S7007, the CPU 205 determines whether the user-specific security policy setting is activated. If the CPU 205 determines that the user-specific security policy setting is deactivated (NO in step S7007), then in step S7005, the CPU 205 applies the security policy setting of the multi function peripheral 1000 to each security-related function. This ends the startup processing.

If the CPU 205 determines that the user-specific security policy setting is activated (YES in step S7007), then in step S7008, the CPU 205 performs login processing that begins from step S8001 in FIG. 8.

FIG. 8 is a flowchart illustrating a control method for the information processing apparatus in the present exemplary embodiment.

This example is a flowchart representing a flow of the login processing of the multi function peripheral 1000 that is executed in response to login by the user. In step S8001, the CPU 205 causes the operation unit 210 to display a login screen. The processing then proceeds to step S8002. In step S8002, the CPU 205 receives input of a user ID and a user password from a user via the operation unit 210. The CPU 205 then causes the RAM 206 to hold the input user ID and user password via the operation unit I/F 209. In the present exemplary embodiment, the RAM 206 is used to store the user ID and the user password temporarily. However, there is no limitation in this respect, and other device such as the HDD 208 may be used. Likewise, there is no limitation for other exemplary embodiments to be described below. Further, in the present exemplary embodiment, the HDD 208 of the multi function peripheral 1000 is assumed to store a user password linked to user information managed based on user authentication. However, this is also an example, and there is no limitation.

In step S8003, the CPU 205 acquires a user password linked to the input user ID from the HDD 208, and checks the acquired user password against the input user password, thereby verifying whether the input user password is valid. The processing then proceeds to step S8004.

When determining that the input user password is not valid (NO in step S8004), the CPU 205 causes the operation unit 210 to display an error, and then the processing returns to step S8002.

If the CPU 205 determines that the input user password is valid (YES in step S8004), then in step S8005, the CPU 205 permits the login to the multi function peripheral 1000. The processing then proceeds to step S8006. In step S8006, the CPU 205 causes the RAM 206 to hold logged-in user information for this user.

This ends the login processing. Upon the end of the login processing, the processing proceeds to step S7009 in FIG. 7. The description will continue returning to FIG. 7.

In step S7009, the CPU 205 acquires the logged-in user information held in the RAM 206, and then the processing proceeds to step S7010. In step S7010, the CPU 205 determines whether the acquired logged-in user information is a target of the user-specific security policy setting.

When the CPU 205 determines that the acquired logged-in user information is not a target of the user-specific security policy setting (NO in step S7010), the processing proceeds to step S7005. In step S7005, the CPU 205 applies the security policy setting of the multi function peripheral 1000, and then the processing ends.

On the other hand, when the CPU 205 determines that the acquired logged-in user information is a target of the user-specific security policy setting (YES in step S7010), the processing proceeds to step S7011. In step S7011, the CPU 205 deactivates the security policy setting of the multi function peripheral 1000, and then the processing ends.

When the logged-in user information is a target of the user-specific security policy setting, this situation corresponds to, for example, a case where the user authority of a logged-in user is set in the user settings 6011 and 6012. In addition, when the logged-in user information is a target of the user-specific security policy setting, this situation corresponds to, for example, a case where the user ID of a logged-in user is set in the user settings 6013 and 6014.

In the above-described processing, switching between application and non-application of the security policy is performed depending on the user information such as the user ID and the user authority. The above-described control performs such switching for each logged-in user, and therefore, the apparatus can be used more flexibly.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-209797, filed Oct. 14, 2014, which is hereby incorporated by reference herein in its entirety.

What is claimed is:

1. An information processing apparatus that communicates with a printing control apparatus, the information processing apparatus comprising:
   a setting unit configured to set a security policy for the information processing apparatus;
   a determination unit configured to determine whether the printing control apparatus is connected in a case where setting of the security policy is activated; and
   a control unit configured to deactivate the setting of the security policy in a case where the printing control apparatus is connected, and configured to apply the setting of the security policy in a case where the printing control apparatus is not connected, wherein the control unit determines whether or not to apply the setting of the security policy in accordance with whether or not the information processing apparatus is connected to the printing control apparatus.

2. An information processing apparatus that communicates with a printing control apparatus, the information processing apparatus comprising:

a setting unit configured to set which one of a first security policy set in the information processing apparatus and a second security policy set in the printing control apparatus takes priority;

a determination unit configured to determine whether the printing control apparatus is connected; and a control unit configured to apply the second security policy in a case where the second security policy is set to have priority over the first security policy, and configured to apply the first security policy in a case where the first security policy is set to have priority over the second security policy, when the printing control apparatus is connected, wherein the control unit determines whether to apply the first security policy or the second security policy in accordance with whether or not the information processing apparatus is connected to the printing control apparatus.

3. The information processing apparatus according to claim 1, wherein the security policy includes designation of an available port, designation of a storage destination of an encryption key, designation of intensity of encryption processing, and designation of complexity of authentication information.

4. The information processing apparatus according to claim 1, wherein the information processing apparatus includes an image forming apparatus, a printing apparatus, and a multifunction image forming apparatus.

5. The information processing apparatus according to claim 1, wherein the printing control apparatus is connected to a network.

6. A control method for an information processing apparatus that communicates with a printing control apparatus, the control method comprising:

setting a security policy for the information processing apparatus;

determining whether the printing control apparatus is connected in a case where setting of the security policy is activated;

deactivating the setting of the security policy in a case where the printing control apparatus is connected, and applying the setting of the security policy in a case where the printing control apparatus is not connected; and determining whether or not to apply the setting of the security policy in accordance with whether or not the information processing apparatus is connected to the printing control apparatus.

7. The control method according to claim 6, wherein the security policy includes designation of an available port, designation of a storage destination of an encryption key, designation of intensity of encryption processing, and designation of complexity of authentication information.

8. The control method according to claim 6, wherein the information processing apparatus includes an image forming apparatus, a printing apparatus, and a multifunction image forming apparatus.

9. The control method according to claim 6, wherein the printing control apparatus is connected to a network.

* * * * *